(12) United States Patent
Tyan et al.

(10) Patent No.: US 6,365,256 B1
(45) Date of Patent: Apr. 2, 2002

(54) ERASABLE PHASE CHANGE OPTICAL RECORDING ELEMENTS

(75) Inventors: Yuan-Sheng Tyan, Webster; Bruno Primerano, Walworth; Giuseppe Farruggia, Webster; Fridrich Vazan, Pittsford; Thomas R. Cushman, Fairport; Donald R. Preuss, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/515,147

(22) Filed: Feb. 29, 2000

(51) Int. Cl.$^7$ ................................................. B32B 3/02
(52) U.S. Cl. .................... 428/64.1; 428/64.5; 428/64.6; 430/270.13
(58) Field of Search ................................ 428/64.1, 64.2, 428/64.4, 64.5, 64.6, 913; 430/270.13, 495.1, 945; 369/283, 288

(56) References Cited

U.S. PATENT DOCUMENTS

| | | | | |
|---|---|---|---|---|
| 5,627,012 A | * | 5/1997 | Tominaga | 430/270.13 |
| 6,108,295 A | * | 8/2000 | Ohno | 369/275.1 |
| 6,153,355 A | * | 11/2000 | Takahashi | 430/270.13 |

FOREIGN PATENT DOCUMENTS

JP           10226173           8/1998

* cited by examiner

*Primary Examiner*—Elizabeth Evans
(74) *Attorney, Agent, or Firm*—Raymond L. Owens (57) ABSTRACT

A rewriteable phase-change optical recording element includes a substrate; and a recording layer over the substrate having at least two sub-layers of different chemical compositions, the compositions and thickness of the sub-layers being selected so that when subject to laser light during a writing process the compositions mixed together to form a high reflectivity mixed crystalline region without using any prior initialization or mixing processes.

4 Claims, 10 Drawing Sheets

ERASABLE PHASE CHANGE OPTICAL RECORDING ELEMENTS

FIELD OF THE INVENTION

The invention relates to rewriteable optical recording elements of the phase-change type.

BACKGROUND OF THE INVENTION

Optical disks utilizing focused laser light to record and retrieve information have gained increasing commercial importance in recent years. The success of these products are due to many factors: high storage capacity, ease of replication, robustness, removability, etc., but the availability of extremely low cost rewriteable phase-change optical recording element is at least as important as any of the other factors.

There are basically three types of optical disks: (1) The read only type (ROM) has data fabricated on the disks as part of the manufacturing process. End users can only read the data from the disks but are not able to record on them; (2) The write-once type (WORM) allows end users to record data on the disks but does not allow them to change the data once written. (3) The rewriteable type (RW) allows data to be written and re-written on the disk many times. Although the ROM type seems limited in its capability, it has been commercially the most successful of the three. The main reason is that it allows huge amounts of data to be replicated and distributed at very low cost. It is currently the dominant method for distributing music, video, data, etc. The successful ROM products include CD-Audio, CD-ROM, DVD-Video, and DVD-ROM, etc. Recently the WORM type media CD-R has become very successful also. Its compatibility with the ROM disks and its low cost are generally considered the main reasons for its success. The RW type, on the other hand, is not as successful at the moment, despite the fact that it is the more capable and flexible. There may be many factors for its lack of success, the high cost of media is considered one of the key reason. There is therefore strong incentive to reduce the cost of the media.

There are currently two main types of RW media. The magneto-optic type that uses the change of magnetization in the recording layer to store data, and the phase-change type that uses the transition between the amorphous state and the crystalline state of the material to store data. Each type has its strengths and weaknesses. The current invention deals with the phase-change type.

Many erasable phase-change materials have been used. Examples of the materials include Ge—Te, Ge—Te—Sn, Sb—Te, Sb—Ge—Te, In—Sb—Te, Sb—Te—In, and Ag—In—Sb—Te. Although this list contains many material systems with different properties, the basic recording element layer structure is the same and so is the read/write operation.

Rewriteable elements of the phase-change type are usually constructed of multi-layer structures. In addition to the phase-change layer, dielectric and reflector layers are also used to control the optical and thermal properties.

When phase-change materials are used for optical recording, a focused laser light is used to switch the material between the amorphous state and the crystalline state. During the conventional recording process, the laser light is pulsed between three power levels. The higher power level melts the material, the intermediate power level heats the material to just below the melting point and above the crystallization temperature, and the lower level is used to control the heating and cooling of the material. The phase-change material, the multi-layer structure of the disk, and the laser pulse sequence are all carefully designed to ensure that the material melted by the high power laser pulse is cooled quickly to quench in the amorphous state. The same design allows the intermediate power pulses to heat the material to just below the melting point and crystallize the material. Thus by alternating the write laser pulses between the power levels one can produce alternate crystalline and amorphous regions on the disk, and this is how information is stored.

As deposited, the recording layer is usually in the amorphous state. In the amorphous state, the reflectance of the recording element is usually too low to allow reliable focusing and tracking for the read/write operation. To solve this problem, a laser initialization step is generally used as part of the manufacturing process. As is conventionally done, a relatively large laser spot that covers several recording tracks is scanned over essentially the entire surface of the recordable area of the recording element. The power of the laser spot and the speed of scanning is adjusted such that to cause crystallization of the recording material. The crystallization of the recording layer increases the reflectance of the recording element and ensures reliable focusing and tracking.

As is practiced today, however, the initialization step is rather slow and is often the rate limiting step of the media manufacturing process. In fact several pieces of initialization equipment are usually used in a production line to match up with the throughput of the rest of the process. The equipment for initialization is expensive and the added initialization step also increases processing costs. In addition, the reflectivity of the media and the erasing speed of the recording material frequently are not finalized by the initializing step. It can take several read/write cycles for these properties to stabilize. This is highly undesirable, especially since most recording schemes today use pulse-width-modulation. Recording using pulse-width modulation increases the recording density but it also increases the sensitivity to small variations in mark size and shape. It is therefore highly desirable to design a recording element that does not require the initialization step.

Japanese Patent Application No. Hei 7[1995]-47822 discloses a means to eliminate the initialization step for chalcopyrite-type recording materials. According to the disclosure, the In—Ag—Te—Sb type recording layer is formed by two separate steps, by first sputtering the Ag—Te material and then the Sb—In material. The Ag—Te material is said to crystallize even at room temperature thereby giving the high reflectivity required for focusing and tracking. As pointed out by the same inventors in a later Japanese Patent Application JPA10-226173, however, such a procedure produces a recording element in which the reflectivity does not stabilize until the re-written region reaches the entire surface. Furthermore, the re-crystallization rate (the erasure rate) does not stabilize until the element has been rewritten several times. The variation of reflectivity and erasure rate during the first few cycles of re-writing creates high error rates especially if mark edge recording is used.

Japanese Patent Application JPA10-226173 discloses an optical recording element wherein the recording layer is constructed of at least a Sb thin-film containing 95% or more Sb and a reactive thin-film in contact with the Sb thin-film. The Sb thin-film and the reactive thin-film react to form the phase-change material. The Sb thin-film is crystalline and could provide the reflectivity for focusing and tracking during recording. Before the recording element could be used, however, a blending process needs to be carried out.

The blending is to mix the Sb thin-film with the reactive thin-film to create the phase-change thin-film. The blending process is similar to the conventional initialization process and a laser light is used to heat up the material. The conventional initialization process crystallizes the recording layer and increases the reflectivity of the recording element. The blending step, on the other hand, results in the dispersion of an amorphous phase in the crystalline Sb phase. The reflectivity decreases, although it is higher than that of the recorded marks. For the Ag—In—Sb—Te based material system, the disclosed media with the blending process was said to have improved stability of reflectivity and erase rate during overwrite cycles and improved durability of media for overwrite cycling. From a media manufacturing point of view, however, JPA10-226173, only replaces the initialization step with the blending step, the cost saving is minimum.

SUMMARY OF THE INVENTION

It is the object of the present invention to provide a rewriteable optical recording element of the phase-change type which can be used without using the conventional laser initialization step or the blending step.

It is the further object of the present invention to provide a recording element and a recording method to provide improved stability of the reflectivity and erasure rate from the first recording as well an improved cycling durability.

These objects are achieved by a rewriteable phase-change optical recording element comprising:
(a) a substrate; and
(b) a recording layer over the substrate having at least two sub-layers of different chemical compositions, the compositions and thickness of the sub-layers being selected so that when subject to laser light during a writing process the compositions can mix together to form a high reflectivity mixed crystalline region without using any prior initialization or mixing processes.

It is a feature of the present invention that by proper selection of the recording layer compositions a desired recording performance can be achieved for different applications.

Another feature of the invention is that by providing the recording layer as two sub-layers of different compositions; the thickness ratio of the two sub-layers can be selected such that when these sub-layers are mixed, the optimum erasable phase-change composition results. The sub-layers can be further selected such that at least one of the sub-layers is in the crystalline state either as deposited or after a simple, mild heat treatment. When only one of the two sub-layers is crystalline, this layer is deposited first nearer to the substrate. The proper recording layer composition is selected such that it can be melted by the erase power during the recording process and be crystallized after it solidifies from the melt. The combined thickness of the sub-layers is selected to provide proper optical and thermal tuning of the multi-layer media package.

A rewriteable phase-change optical recording element in accordance with the present invention can use a high erasable power to ensure that the recording layer is melted during the erasing cycle of the recording process.

A preferred embodiment uses a recording layer composition represented by the formula $Sb_{1-x-mx}Te_xIn_{mx}$ wherein by $0.63 \geq m \geq 0.15$, and $0.35 \geq x \geq 0.28$, The first sub-layer consists essentially of Sb, the second sub-layer consists essentially of $TeIn_m$ wherein $0.63 \geq m \geq 0.15$.

BRIEF DESCRIPTION OF THE DRAWINGS

FIG. 3c is a diagrammatic view of a write laser pulse-train that is used to overwrite on the data written in FIG. 3a;

DETAILED DESCRIPTION OF THE PREFERRED EMBODIMENTS

Figure 1A:
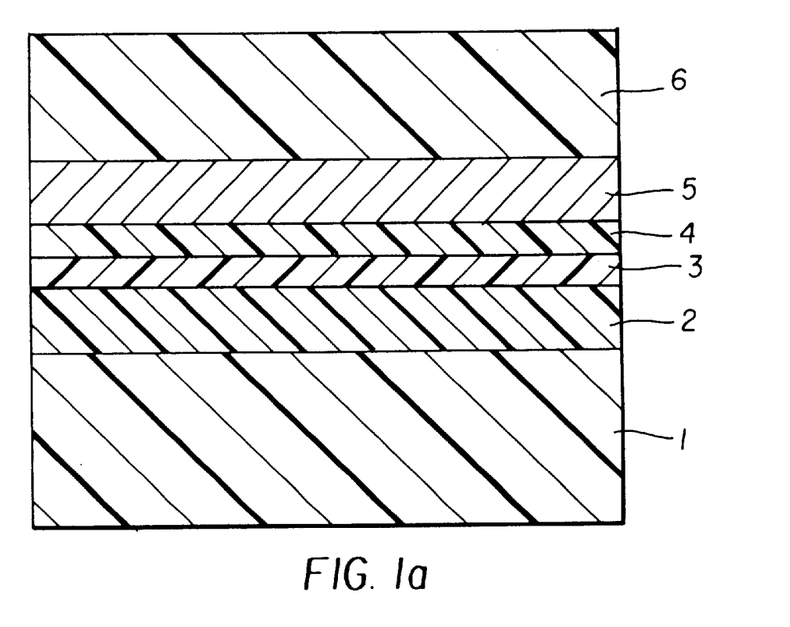
FIGS. 1a and 1b respectively show cross-sectional views of a four-layer disk according to the prior art and of a four-layer disk according to the current invention.

FIG. 1a shows a conventional design of a four-layer rewriteable structure of the phase-change type according to the prior art. Onto a transparent substrate 1, the phase-change recording layer 3 is deposited between two dielectric layers: 2 and 4. In addition, a metallic reflector layer 5 is deposited over the dielectric layer 4. Some additional mechanical protection can be provided by spin-coating a UV-curable lacquer layer 6 over the metallic reflector layer 5. The phase-change recording layer 3, the dielectric layers 2 and 4, and the metallic reflector layer 5 are prepared by sputter deposition. Examples of the dielectric layers 2 and 4 are ZnS—$SiO_2$, SiN, and SiO. Examples of the metallic reflector layer 5 are Al—Cr, Al—Ti, Au, and Ag. Examples of the phase-change recording layer 3 are SbTe, (SbTe) In, AgInSbTe, and SbTeGe.

Figure 1B:
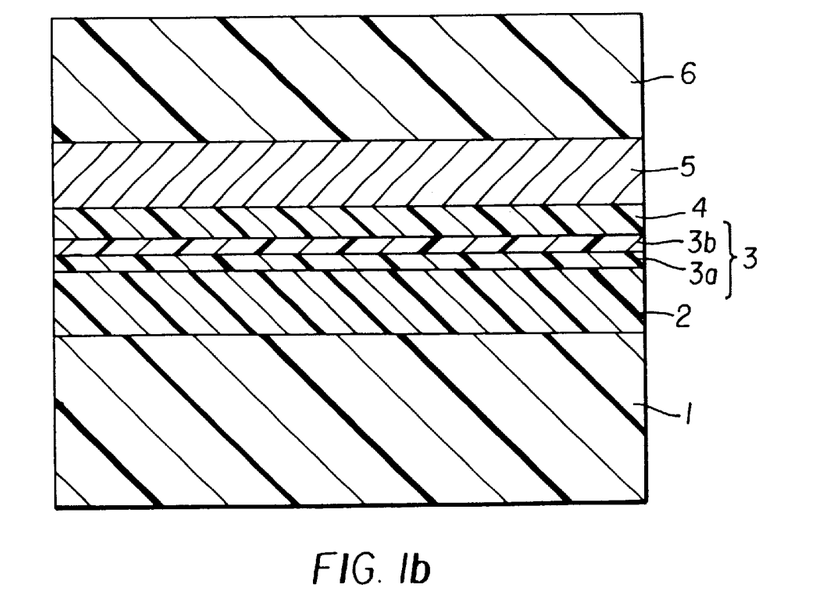

FIG. 1b shows the cross-sectional view of a rewriteable phase-change optical recording element according to the present invention. Where parts correspond to FIG. 1a, the same numerals will be used. Here, two sub-layers 3a and 3b provide the phase-change recording layer 3. All other layers are the same as those used in the conventional design. The thickness and the compositions of the sub-layers 3a and 3b are selected such that when completely mixed the resulting composition is identical to a preferred composition used in the conventional design. For the present invention, a preferred composition is represented by the formula $Sb_{1-x-mx}Te_xIn_{mx}$ wherein $0.63 \geq m \geq 0.15$, and $0.35 \geq x \geq 0.28$. This can be achieved by using a sub-layer including a substantial component of Sb and a second sub-layer including $TeIn_m$. By selecting m in the $TeIn_m$ sub-layer and the relative thickness of the two sub-layers 3a and 3b, proper composition in the preferred composition range can be achieved. The total thickness of the sub-layers 3a and 3b is selected to ensure proper optical and thermal tuning for the recording conditions desired.

The sub-layer 3a is selected so that it is crystalline as deposited or is easily made crystalline by a mild post heat-treatment. It should be noted that sub-layer 3a should be coated first nearer the substrate 1 so that the resulting element will have higher reflectivity. In the example above, the sub-layer 3a is substantially Sb and has a crystallization temperature just slightly above the room temperature. It can be crystalline as deposited if the deposition conditions are appropriate. If not, a mild heat treatment at, for example, 80° C. can be used to crystallize the sub-layer 3a. It should be deposited first nearer to the substrate 1 side so that for through-substrate recording a higher reflectivity is achieved.

Figure 2A:
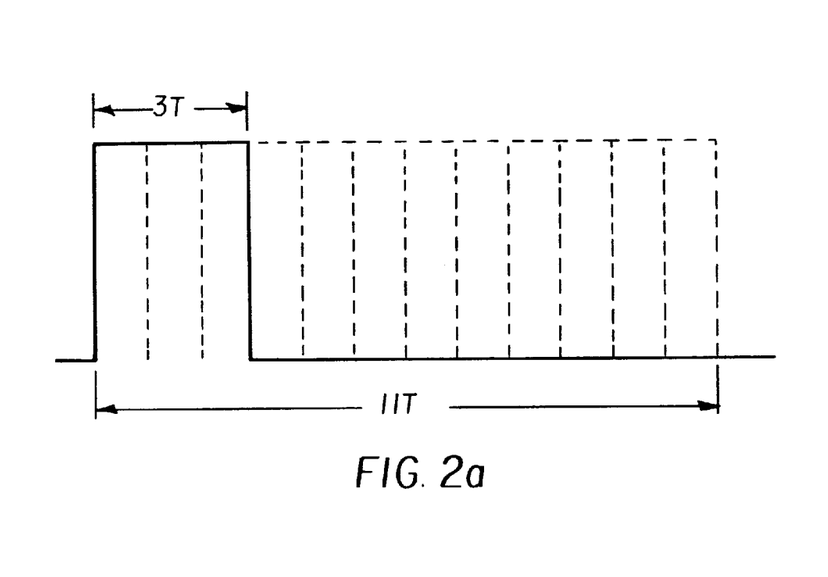
FIG. 2a is a diagrammatic view of a data pattern to be recorded onto a recording element.
Figure 2B:
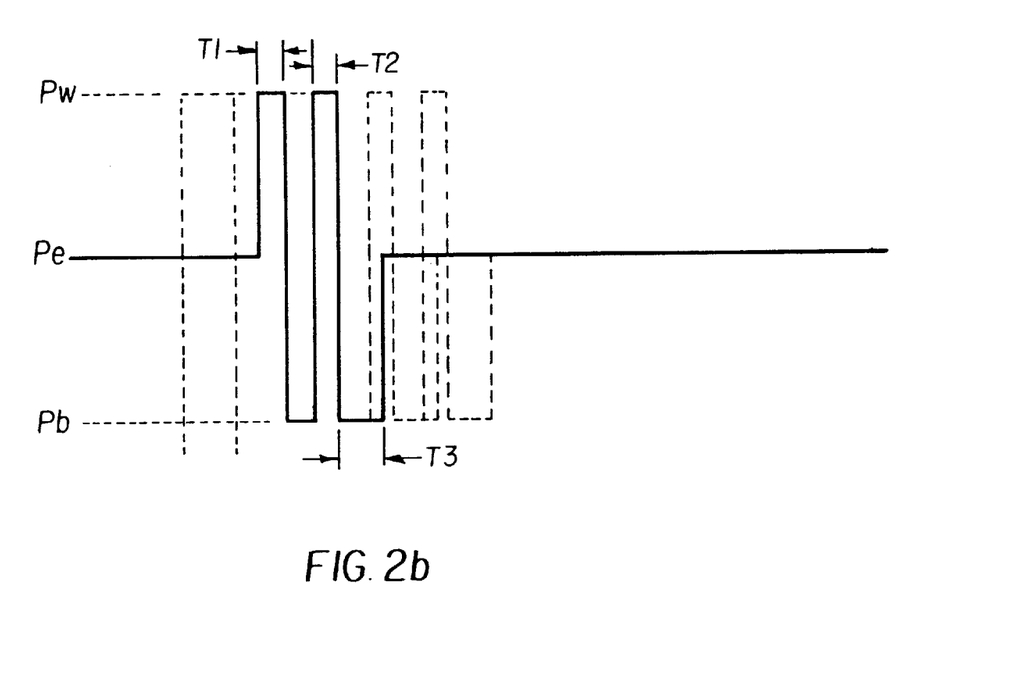
FIG. 2b is a diagrammatic view of a write strategy used for recording the data pattern in FIG. 2a onto a recording element of the invention.

During the conventional recording process of the phase-change type, the writing process utilizes a pulsed laser light to heat the rewriteable phase-change optical recording element in order to induce the desired phase change according to the laser pulses used. FIG. 2b demonstrates a typical write strategy that is commonly used to record an EFM data pattern as shown in FIG. 2a. Here the write strategy refers to a particular laser pulsing sequence used for data recording. In the conventional phase-change recording process the laser light is modulated between three power levels. The highest power level Pw, the write power, is used to melt the material and quench it into the amorphous phase. The intermediate level Pe, the erase power, is used to heat the material to below the melting point to accelerate the crystallization process. The lowest power level Pb, the bias power, following the Pw pulses is used to control the cooling of the material after the higher power laser pulses. These three power levels and their durations are carefully chosen for each recording element to ensure that a precise size of phase-change material is amorphized after exposure by Pw, and all the rest of the material is crystallized. In the examples illustrated in FIG. 2a and FIG. 2B two Pw pulses and a Pb gap are used to record a 3T size mark with duration T1 T2, and T3 respectively. The laser power is kept at Pe everywhere else. For a longer mark, T4 to T11, additional Pw pulses of duration T2 are added. For example to record a T5 mark, one T1 pulse and three T2 pulses are used followed by a T3 gap.

This conventional recording process can be used for the present invention. During the first recording on a fresh element, a fraction of the materials are exposed to Pw. The sub-layers 3a and 3b in the region exposed to Pw will be melted by Pw and, due to their small thickness and their intimate contact with each other, they will be mixed together. In fact in most cases substantially complete mixing can be achieved after first exposure to Pw. These regions after mixing now behave just like a conventional single-layer recording element with the same composition and similar thickness. They are quenched into the amorphous phase just like their conventional counterparts. The regions exposed to Pe, on the other hand, stay as two separate sub-layers 3a and 3b and retain the original reflectance.

During the second and subsequent writings each time there will be regions exposed to Pw and regions exposed to Pe. Pw exposure always melt and the phase-change recording layer 3 and leave the regions in the amorphous state. Pe exposure, on the other hand, only has an effect on the regions previously mixed by Pw exposure. These regions will become crystallized as the mixed regions behave just like their single-layer counterparts in the conventional structure. Regions never before exposed to Pw and stay as two sub-layers 3a and 3b, Pe exposure causes essentially no change. It is to be pointed out that during the first few cycles there will be regions that have been mixed and recrystallized as well as regions that have never been exposed to Pw. In both cases the material is crystalline. In the mixed regions, however, the crystalline phase is that of the mixed composition and in the other regions it is that of the sub-layers 3a and 3b. The reflectivity of the two crystalline phases may be different and, if so, there will be noise increase during the initial cycles.

Figure 3A:
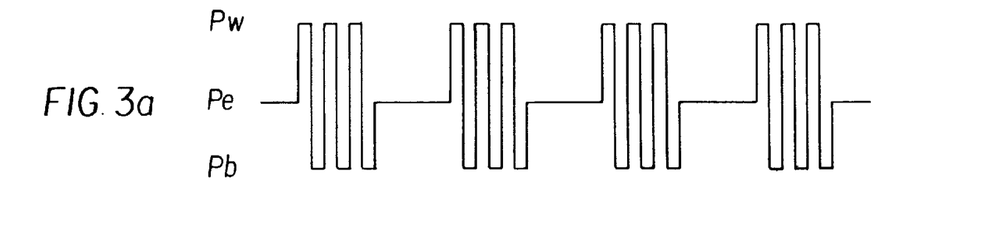
FIG. 3a is a diagrammatic view of a write laser pulse-train used to record data onto a recording element of the invention.
Figure 3B:
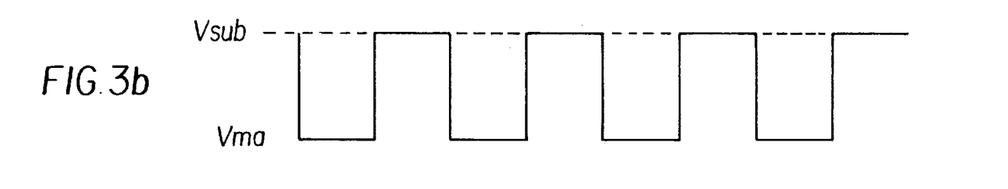
FIG. 3b is a diagrammatic view of the readout waveform of a recording element of the invention after recording using low erase power (Pe)

FIG. 3a shows a laser light pulse train for writing a single tone signal on the rewriteable phase-change optical recording element. It involves a sequence of laser light pulses modulating between Pw, Pe, and Pb. When the rewriteable phase-change optical recording element of the present invention is subjected to this laser light pulse train for the first time, the regions exposed to Pw are melted, mixed, and quenched into the amorphous state with readout signal $V_{ma}$ corresponding to the reflectivity of the mixed amorphous phase. The regions exposed to Pe, on the other hand, remain unmixed with a readout $V_{sub}$ corresponding to the reflectivity of the sub-layers 3a and 3b. This is illustrated in FIG. 3b.

Figure 3C:
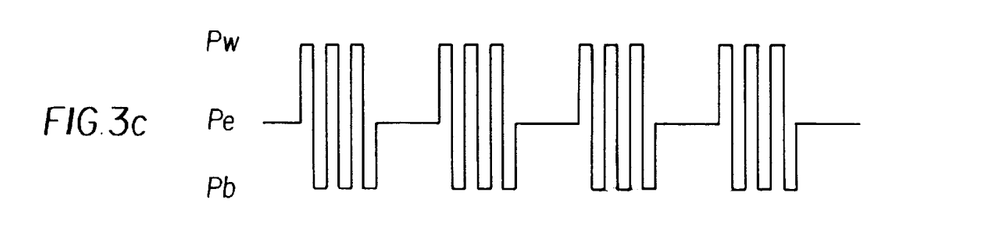
Figure 3D:
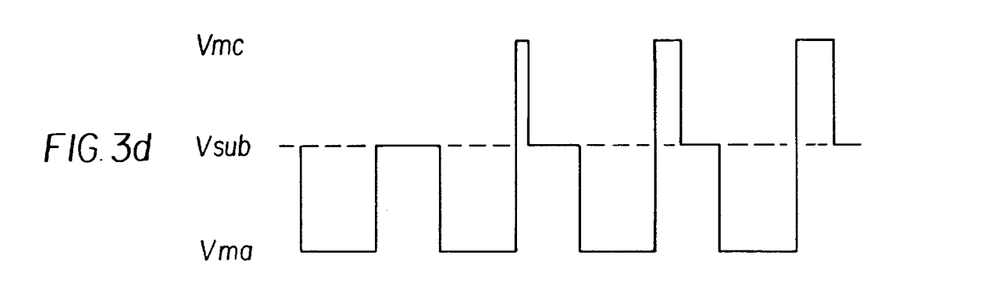
FIG. 3d is a diagrammatic view of the readout waveform of a recording element of the invention after the first overwrite (the second write) using low Pe.

When the rewriteable phase-change optical recording element is exposed the second time to a different laser pulse train, in this case we use a pulse train that has the same Pw duration and shorter Pe duration, the reflectivity is changed as illustrated in FIG. 3c. The regions exposed to Pw during the second write become mixed and amorphized irrespective of their states after the first write. The regions exposed to Pe, however, will end up with two different states depending on their states after the first write. Those regions mixed by the first write will transform into the crystalline state of the mixed phase with readout signal $V_{mc}$. Those not mixed by the first write will stay at $V_{sub}$. If $V_{mc}$ is different from $V_{sub}$, a distorted waveform is resulted, as illustrated in FIG. 3d. This distortion will increase noise and jitter when the recorded data is read back. This situation is summarized in Table 1 below.

TABLE 1

| First Write Exposure | Second Write Exposure | Readout After 2nd Write |
| --- | --- | --- |
| Pe | Pe | $V_{sub}$ |
| Pe | Pw | $V_{ma}$ |
| Pw | Pe | $V_{mc}$ |
| Pw | Pw | $V_{ma}$ |

It has been found that this noise and jitter can be improved by using a different write-strategy. Quite unexpectedly, it has been discovered that by increasing the Pe level, melting and mixing of the sub-layers 3a and 3b can be achieved during Pe exposure. Furthermore, if proper compositions, disk (rewriteable phase-change optical recording element) structures, and write strategies are used, the phase-change materials can actually crystallize after being melted and mixed by Pe. This is unexpected because the conventional wisdom tells us that to crystallize the material, Pe cannot heat the material to above the melting point. It is also unexpected because the same material in the same disk structure after being melted and mixed by Pw stays amorphous and does not crystallize.

Figure 3E:
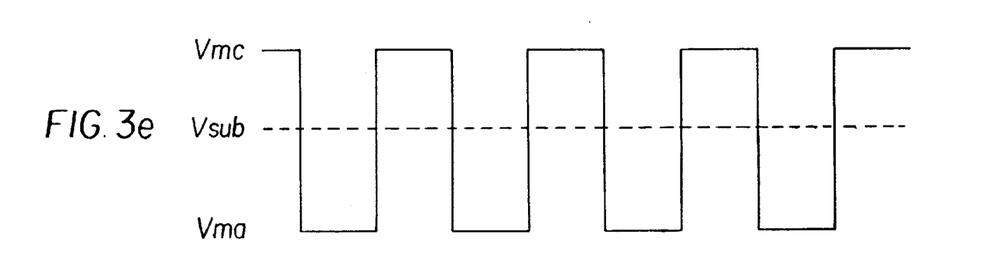
FIG. 3e is a diagrammatic view of the readout waveform of a recording element of the invention after many overwrites using low Pe, or the view of the reflectance of a recording element after first write and after subsequent overwrites using high Pe according to the invention.

Thus, according to the present invention, an improved write strategy can be used. In this strategy, the laser light is modulated between the three power levels, Pw, Pe, and Pb during the writing process just as in the conventional method of writing. The erase power Pe, however, is increased to ensure that the material heated by Pe is melted and mixed. As in the conventional method, the erase power is held constant without pulsing whereas the write power is pulsed with usually less than 50% duty cycle. As a result, even though the absolute power level Pe is lower than Pw, the material can actually be heated to higher temperature with Pe. Because of the lack of pulsing, furthermore, the cooling rate after heating by Pe is smaller than by Pw. It is therefore possible, if proper phase-change composition is used, for the material melted by Pe to re-crystallize even though the material melted by Pw is amorphized. Thus, with the improved method, both Pw and Pe melt and mix the material. The first recording process will convert substantially the entire written track into the mixed final composition. The regions exposed to Pe will crystallize and attain $V_{mc}$ after the exposure and those regions exposed to Pw will amorphize and attain $V_{ma}$. There will no longer be any region in the $V_{sub}$ reflectivity state after the first recording and the aforementioned noise problem is reduced or eliminated. FIG. 3e illustrates the readout levels of the data track after writing with the new method. Only two readout levels, $V_{mc}$ and $V_{ma}$ exist and the recorded waveform is not distorted. This situation is summarized in Table 2 below:

TABLE 2

| First Write Exposure | Second Write Exposure | Reflectivity After 2nd Write |
|---|---|---|
| Pe | Pe | $V_{mc}$ |
| Pe | Pw | $V_{ma}$ |
| Pw | Pe | $V_{mc}$ |
| Pw | Pw | $V_{ma}$ |

To make the process work, the proper selection of erasable phase-change material is necessary. The crystallization rate of the material just below the melting point has to be fast enough for melting by Pe to yield the crystalline state and slow enough for melting by Pw to yield the amorphous state. If the crystallization rate is too low, the material will be quenched into the amorphous state after being melted and mixed by the exposure to Pe. If the crystallization rate is too fast, it will be difficult to achieve good amorphization after the Pw exposure.

Japanese Patent Application JPA10-226173 described an erasable phase-change media structure similar to what is suggested according to the present invention. The rewriteable phase-change optical recording elements comprise two sub-layers with one of them essentially Sb and the other a AgInTe based alloy. The recording element as taught in JPA10-226173, however, require a blending step during the manufacturing process for them to function properly. The blending step involves using a laser light to melt and mix the sub-layers during the manufacturing process. After the blending step the material is left in the amorphous state with a reflectivity lower than that of the sub-layers. Since the need for the blending step and the lowering of the reflectivity are both undesirable, JPA10-226173 clearly does not suggest or recognize the present invention.

The principles of the present invention will be illustrated by the following examples. It should be understood, however, that these examples are not designed to show the best possible recording performance using the present invention. For example, no attempt was made to optimize the optical tuning of the multi-layer package for each rewriteable phase-change optical recording element in the form of a disk used in the examples.

Unless otherwise stated, all sample disks were fabricated using an injection molded 0.6 mm thick polycarbonate substrate 1. One surface of the substrate contained guide grooves into which the data were recorded. These grooves were about 25 nm in depth and had a pitch of 0.74 $\mu$m. Onto the groove surface of the substrate a first dielectric layer 2 of 60 nm thickness was RF-sputtered onto the substrate 1 using a ZnS—SiO$_2$ target containing 20% SiO$_2$. Onto the first dielectric layer 2 the recording layer 3 was deposited. According to the present invention, the recording layer 3 was constructed of two sub-layers 3a and 3b each deposited from the respective targets using DC-sputtering. A second dielectric layer 4 of 20 nm thickness was then RF-sputtered from a ZnS—SiO2 target, followed by a metallic reflector layer 5 of 100 nm thickness DC-sputtered from a Al-2%Cr target. Finally a 2–10 $\mu$m lacquer protective layer 6 was spin-coated onto the Al-2%Cr reflector layer 5 and UV-cured.

All disk samples were tested using a commercial Pulstec tester equipped with a 640 nm 0.6 NA recording/read back head with RIM-intensity of 0.5 in the tangential direction and 0.48 in the radial direction. The linear velocity of the rewriteable phase-change optical recording element is set to be 3.5 m/S. The testing was done either using a tone of 50% duty cycle or a random EFM pattern. The clock period T was set to 38.23 nS. Data-to-clock jitter was used as the principal measure of recording performance.

EXAMPLE 1

A recording disk was prepared following the general procedure as described above. The first sub-layer 3a was sputtered from a Sb target using 40 W sputtering power; the second sub-layer 3b was sputtered from a TeIn$_{0.37}$ target, using also 40 W of sputtering power. The Sb and Te sub-layers 3a and 3b were about 8.2 nm and 7.5 nm in thickness, respectively. The combined composition was analyzed by ICP to be approximately Sb$_{0.565}$Te$_{0.315}$In$_{0.120}$ when the two sub-layers 3a and 3b are mixed.

Tested on the Pulstec tester, the reflectivity R$_{sub}$ was measured to be about 7%, which is too low to allow adequate tracking for data recording.

The disk was then kept at room temperature for 16 hours. Tested on the Pulstec tester, the reflectivity R$_{sub}$ now increased to about 10.5%, suggesting that the Sb sub-layer had been crystallized by the heat treatment.

Figure 4A:
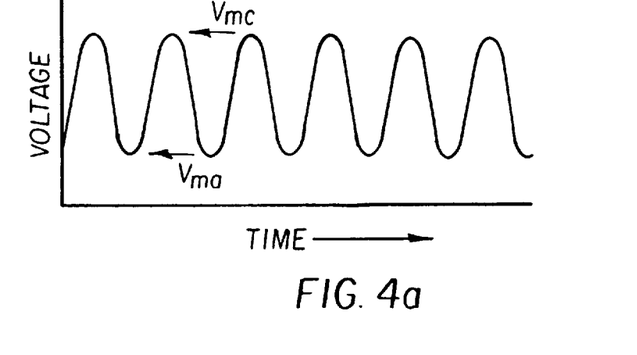
FIGS. 4a–4c show the readout waveforms of a recording element according to the current invention after various overwrite conditions using high Pe.

A recording experiment was performed using a write strategy as illustrated in FIG. 2a with the parameters: Pw=11.8 mW, Pe=7.4 mW, Pb=1 mW, T1=0.32 T, T2=0.32 T and T3=0.8 T. Using an 11 T tone as the signal source, the read back signal from the recorded marks is shown in FIG. 4a with readout signal varied between $V_{mc}$ corresponding to the reflectivity of the mixed crystalline phase, and $V_{ma}$ corresponding to the reflectivity of the mixed amorphous phase. $V_{mc}$ is higher than $V_{sub}$ corresponding to the reflectivity of the unrecorded element with sub-layers 3a and 3b.

As discussed earlier, regions with $V_{ma}$ were those exposed to Pw, melted and quenched into the amorphous state of the mixed composition. The regions with $V_{mc}$, on the other hand, were exposed to Pe. These regions were also melted and mixed, but they crystallized after the laser exposure because of the slower cooling rate.

Figure 4B:
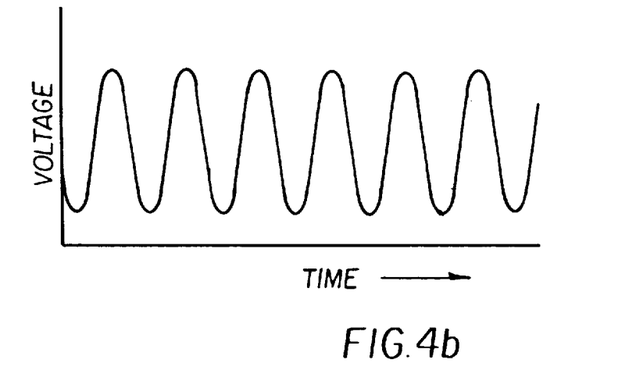
Figure 4C:
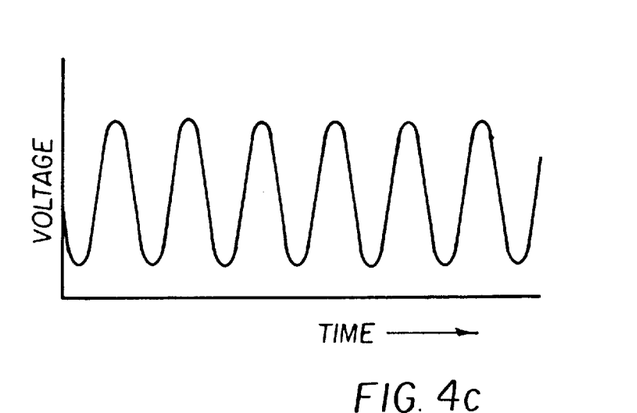

Onto the same data track, a 10T data pattern was then overwritten using the same write strategy. The readout signal is shown in FIG. 4b. Again the signal varies between $V_{mc}$ and $V_{ma}$ and the readout waveform is very similar to that observed after the first write. FIG. 4c shows the readout waveform after 10 direct overwrites. Essentially no change is observed between the three waveforms.

These results demonstrated that a disk according to the present invention show stable recording performance right from the first recording without any need for initializing or blending process steps.

COMPARATIVE EXAMPLE 1

On the same disk used in Example 1 above, another recording experiment was performed. In this experiment all parameters were identical to those used in Example 1 except the level of Pe was lowered to 5 mW. The selection of this power level was to mimic the conventional recording processes. In conventional recording processes Pe only heats the recording material to an elevated temperature to accelerate the crystallization process, but it does not heat the material to above the melting point.

Figure 4D:
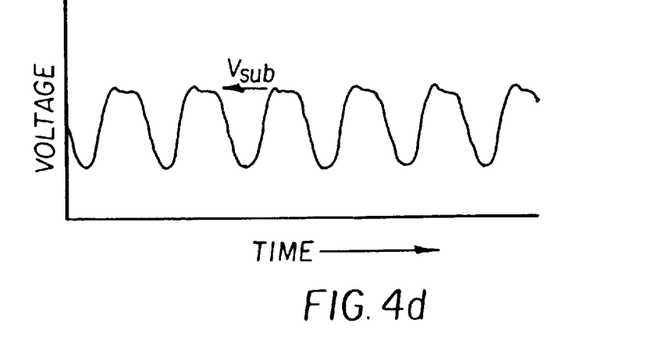
FIGS. 4d–4f show the readout waveforms of a recording element according to the current invention after various overwrite conditions using low Pe.

The readout waveform after the first recording is shown in FIG. 4d. Now the readout level varies only between $V_{ma}$ and Vsub. Those regions with $V_{ma}$ were again exposed to Pw, melted, mixed, and quenched into the amorphous phase of the mixed composition. The region with $V_{sub}$, on the other hand, were those exposed to Pe. Because of the lower power level used for Pe, these regions were essentially unchanged by the laser exposure and remained as sub-layers 3a and 3b retaining the original reflectivity.

Figure 4E:
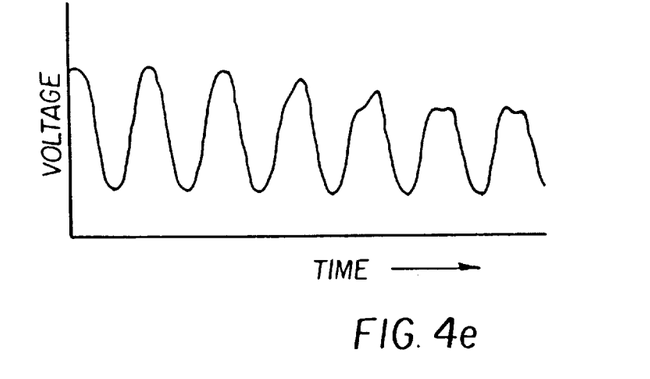

Using the same parameters, a 10T pattern was overwritten on the same data track. The readout waveform now looked like that in FIG. 4e. The bottom level of the waveform was uniform at $V_{ma}$ but the top reflectivity level varied from peak to peak. This is explained as follows. The low Pe used was not sufficient to cause melting of the material. For regions exposed to Pe in the first-write, the second exposure to Pe caused no change in the material and the reflectivity stayed at $R_{sub}$. For regions exposed to Pw in the first write, and turned into the amorphous phase of the mixed composition, the exposure to Pe caused them to crystallize. These regions attained $V_{mc}$. Due to the two different data patterns used for the two writes, there was a gradation in the degree of overlaps between the two laser trains, causing varying length steps in reflectivity, as illustrated in FIG. 3c, within the regions exposed to Pe on the second write. Because of the small feature size involved, however, these steps could not be resolved by the read-back laser light. Instead, the varying lengths of the steps were manifested as different reflectivity levels. This variability in the top readout level can cause readout errors and therefore is not desirable.

Figure 4F:
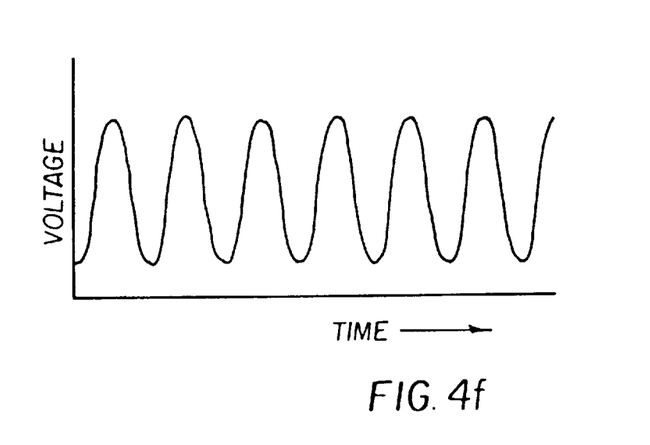

After several overwrites all of the materials on the data track would have been melted at least once and turned into the mixed composition. The state of the material was now determined only by the last laser exposure: exposure to Pw yielded $V_{ma}$ and exposure to Pe yielded $V_{mc}$. FIG. 4f shows the readout waveform after ten direct-overwrites. A uniform waveform was indeed observed, with peak and bottom readout levels at $V_{mc}$ and $V_{ma}$, respectively.

This example illustrates the deficiency of the conventional recording method. When low Pe level is used, only the region exposed to Pw is melted and mixed. It takes several write cycles to cause the entire data track to mix. The use of the high Pe is advantageous not only for the rewriteable phase-change optical recording element of the present invention. Even for conventional, single layer rewriteable phase-change optical recording element melting is frequently needed for the phase-change material to reach the stable phase for cycling. For AgInSbTe material, for example, it has been suggested that the optimum recording is only achieved after the recording material is segregated into a dispersion of $AgInTe_2$ in the Sb crystalline phase through melting.

COMPARATIVE EXAMPLE 2

Another disk sample was fabricated as in Example 1, except the thickness of the Sb sub-layer 3a was reduced to 7.4 nm and the thickness of the $TeIn_{0.37}$ sub-layer 3b was increased to 8.5 nm. This change in the relative thickness of the two sub-layers 3a and 3b kept the optical and thermal packages of the recording disk essentially unchanged, but caused a significant change in the composition of the recording layer 3 after mixing. The composition of the mixed material now became $Sb_{0.511} Te_{0.357} In_{0.132}$. The higher Te concentration resulted in a much slower crystallization rate after melting than the composition used in Example 1. The reflectivity of the disk before and after the 16 hours room temperature keeping was similar to that observed for the disk in Example 1.

Figures 5A, 5B:
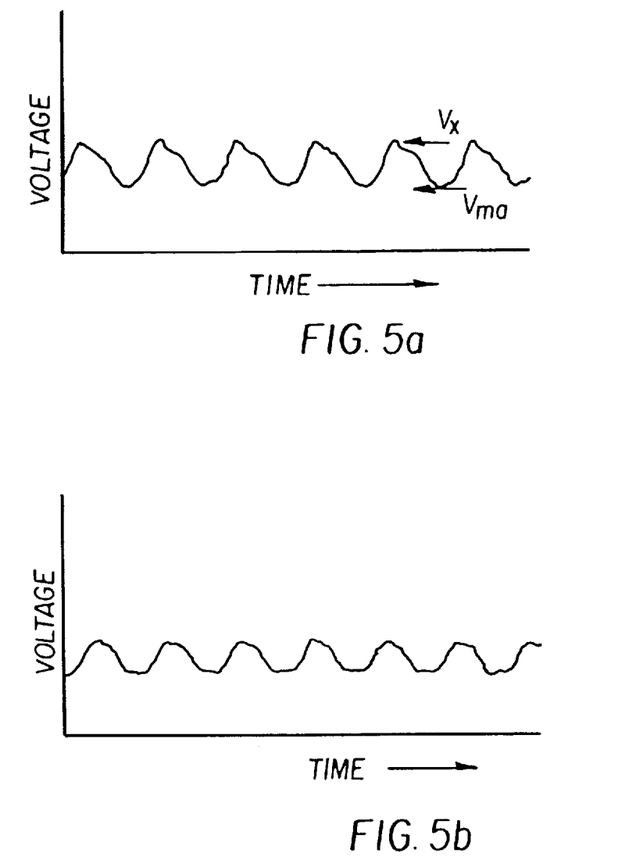
FIGS. 5a–5c show the readout waveforms after various overwrite conditions of a comparative example using high Pe, wherein the phase-change material has too slow a crystallization rate.

The same recording experiment was carried out using a write strategy as illustrated in FIG. 2a with the parameters: Pw=11 mW, Pe=7.0 mW, Pb=1 mW, T1=0.32 T, T2=0.32 T and T3=0.8 T. Using an 11T tone as the signal source, the read back signal from the recorded marks is shown in FIG. 5a with levels varied between $V_{ma}$ and a value Vx that is lower than $V_{sub}$ but higher than $V_{ma}$. These results can be understood as follows. As discussed earlier, regions with $V_{ma}$ were those exposed to Pw, melted and quenched into the amorphous state of the mixed composition. The regions with the new level, Vx, on the other hand, were exposed to Pe. These regions were also melted and mixed and, contrary to that observed in Example 1, in this case the phase-change material, because of the slower crystallization rate, also amorphized. Because of the slower cooling rate, the amorphized region was smaller than that achieved after the exposure to Pw, giving rise the read back level Vx that was higher than $V_{ma}$.

Figure 5C:
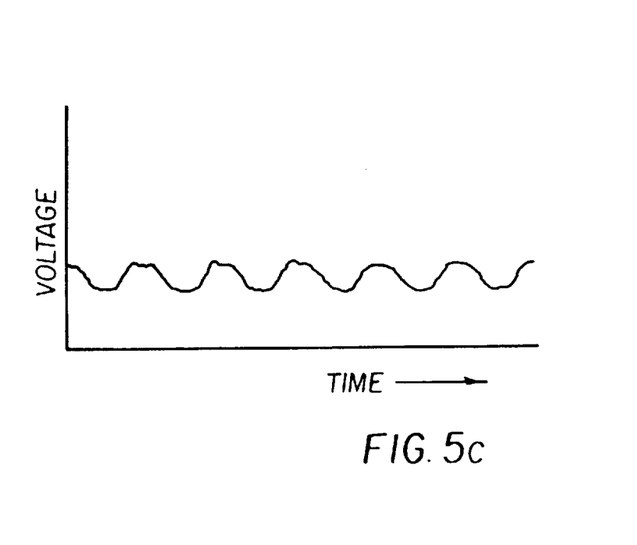

Onto the same data track, a 10T data pattern was then overwritten using the same write strategy. The readout signal is shown in FIG. 5b. Again the readout varied between $V_x$ and $V_{ma}$ and the readout waveform was very similar to that observed after the first write. FIG. 5c shows the readout waveform after 10 direct overwrites. The qualitative features are very similar in the three waveforms.

This example illustrates that if the crystallization speed of the phase-change material is low, high Pe cannot be used to achieve good recording performance.

COMPARATIVE EXAMPLE 3

A low Pe recording experiment was performed on the disk used in Comparative Example 2. All parameters were identical to those used in that example except the value of Pe was reduced to 5.0 mW.

Figure 5D:
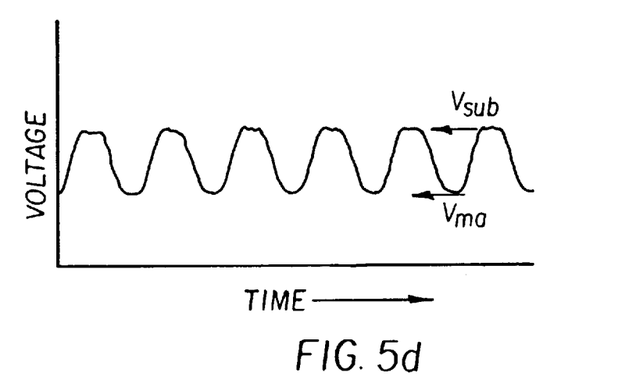
FIGS. 5d–5f show the readout waveforms after various overwrite conditions of a comparative example using low Pe, wherein the phase-change material has too slow a crystallization rate.
Figure 5E:
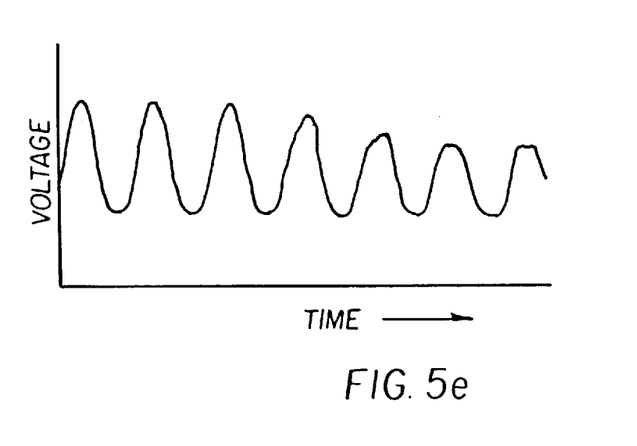
Figure 5F:
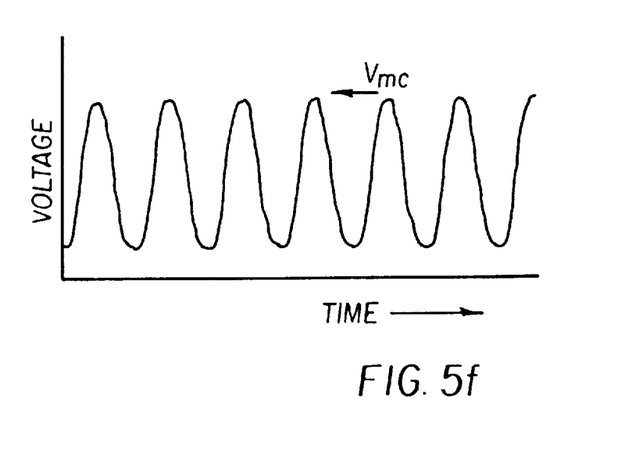

The readout waveforms after the first write, after the first overwrite with a 10T data pattern, and after 10 direct overwrites are shown in FIG. 5d, FIG. 5e, and FIG. 5f, respectively. These waveforms are very similar to the corresponding waveforms in FIG. 4, and their results are similarly interpreted.

Thus, if a relatively slow-crystallizing material is used with low Pe, the recording behavior is "normal" after the melting and mixing have been completed. In this Comparative Example 3 the melting and mixing were accomplished by repeating the overwrite a few times. It is also possible to perform the function through a blending process using a separate step during the disk manufacturing process. In this process a laser light with enough power to melt and mix the material is scanned over the disk surface as suggested by Japanese Patent Application JPA10-226173. In fact the readout level would decrease from $V_{sub}$ to $V_x$ as a result since the material is not fast enough to crystallize after melting by the scanning laser, just as it is not fast enough to crystallize after melting by Pe.

COMPARATIVE EXAMPLE 4

Another disk sample was fabricated as in Example 1, except the thickness of the Sb sub-layer 3a was increased to 9.4 nm and the thickness of the $TeIn_{0.37}$ sub-layer 3b was reduced to 6.0 nm. This change in the relative thickness of the two sub-layers 3a and 3b kept the optical and thermal packages of the recording disk similar to the other disks, but resulted in a significant change in the composition of the recording layer after mixing. The composition of the mixed material now became $Sb_{0.652}Te_{0.254}In_{0.094}$. The lower Te concentration resulted in a much faster crystallization rate after melting than the composition used in Example 1. The reflectivity of the disk before and after the 16 hours room temperature keeping was similar to that observed for the disk in Example 1.

Figure 6A:
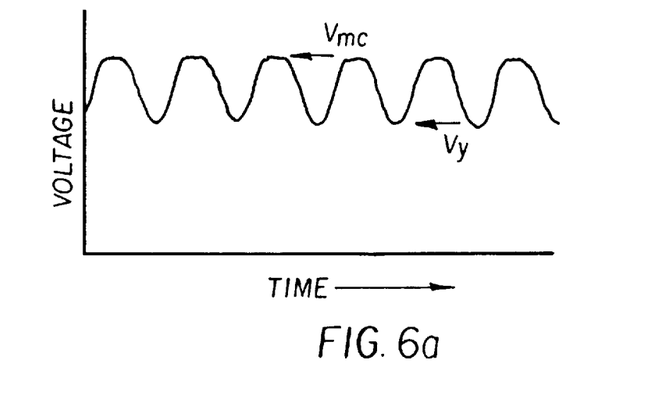
FIGS. 6a–6c show the readout waveforms after various overwrite conditions of a comparative example using high Pe, wherein the phase-change material has too fast a crystallization rate.

The same recording experiment was done using a write strategy as illustrated in FIG. 2a with the parameters: Pw=11 mW, Pe=7.0 mW, Pb=1 mW, T1=0.32 T, T2=0.32 T and T3=0.8 T. Using an 11T tone as the signal source, the read back signal from the recorded marks is shown in FIG. 6a with levels varied between $V_{mc}$ and a value $V_y$ that was lower than $V_{sub}$ but higher than $V_{ma}$. These results can be understood as follows. Regions with $V_y$ were those exposed to Pw, melted and quenched into the amorphous state of the mixed composition. Because of the faster crystallization rate of the phase-change material used in this case, however, the quenching rate was not quite enough and much of the molten area was recrystallized upon solidification. This resulted in smaller amorphous spots with a read-back value $V_y$ that is higher than $V_{ma}$. The regions exposed to Pe, on the other hand were melted and recrystallized as in Comparative Example 1. These regions achieved the readout value $V_{mc}$.

Figure 6B:
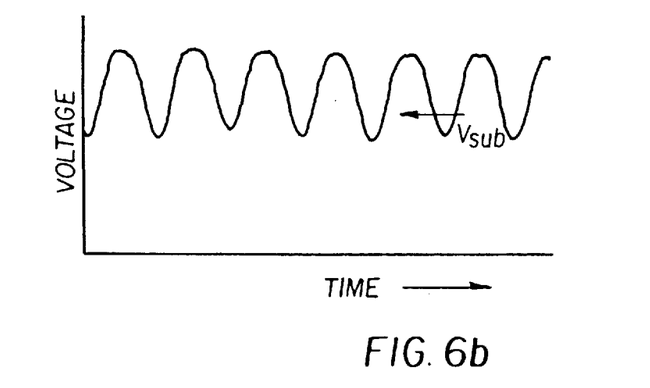
Figure 6C:
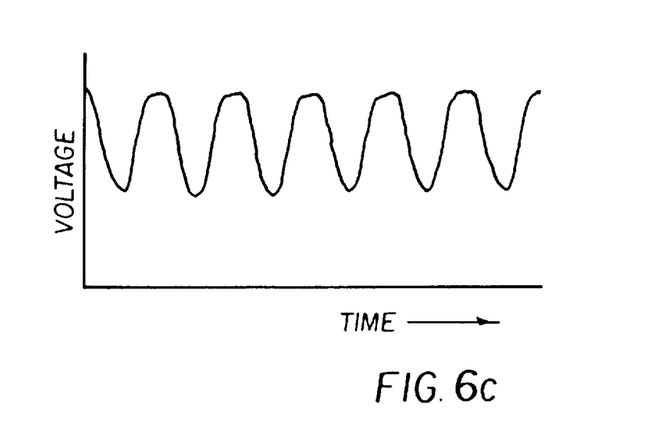

Onto the same data track, a 10T data pattern was then overwritten using the same write strategy. The readout signal is shown in FIG. 6b and that after 10 direct overwrites is shown in FIG. 6c. In both cases the qualitative features were very similar to that in FIG. 6a. The small decrease in $V_y$ with cycling is believed to be due to a change in crystallization rate of this material with cycling.

This example illustrates that if the crystallization speed of the phase-change material is too high, optimum performance cannot be achieved even with high Pe.

COMPARATIVE EXAMPLE 5

A low Pe recording experiment was performed on the disk used in Comparative Example 4. All parameters were iden-tical to those used in that example except the value of Pe was reduced to 5.0 mW.

Figure 6D:
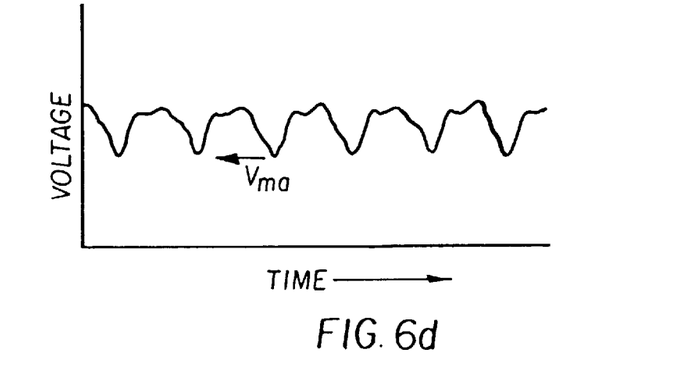
FIGS. 6d–6f show the readout waveforms after various overwrite conditions of a comparative example using low Pe, wherein the phase-change material has too fast a crystallization rate.
Figure 6E:
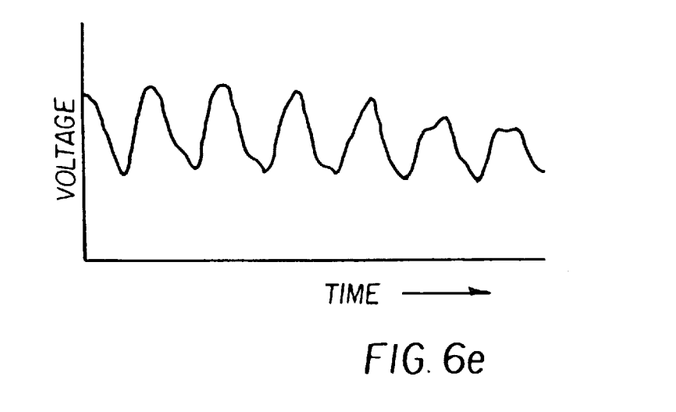
Figure 6F:
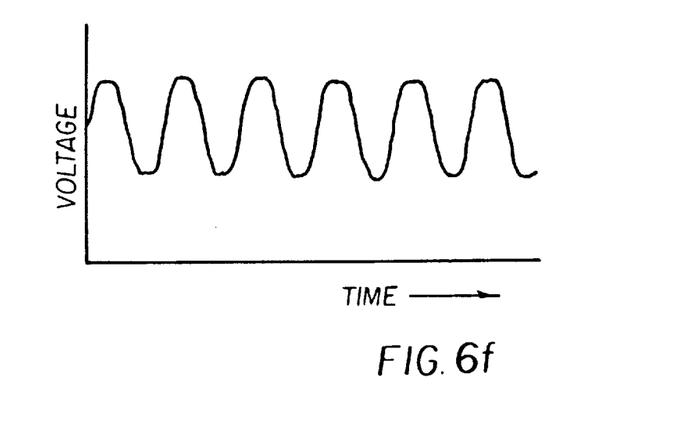

The readout waveforms after the first write, after the first overwrite with a 10T data pattern, and after 10 direct overwrites are shown in FIG. 6d, FIG. 6e, and FIG. 6f, respectively. These waveforms were very similar to the corresponding waveforms in FIG. 4 except that the signal level corresponding to the amorphous state was somewhat higher than that in FIG. 4 indicating that the amorphous phase was not fully quenched due to the high crystallization rate. Thus, if an overly fast crystallizing material is used with low Pe, it still takes several overwrite cycles before full mixing can be achieved. Even after full mixing the recording performance is inferior due to difficulty in achieving full amorphization.

EXAMPLE 2

The above examples demonstrated the importance of selecting phase-change materials with appropriate crystallization rate. In all phase-change alloys, the crystallization rate is strongly dependent on alloy composition. To determine the optimum composition range in the SbTeIn alloy system, a series of disk samples were made as in Example 1. In each disk the recording layer 3 includes two sublayers 3a and 3b. The first sub-layer 3a is Sb and the second sub-layer 3b has a composition expressed by $TeIn_m$. These sub-layers 3a and 3b were prepared by sputtering from an Sb target and a $TeIn_m$ target respectively. When combined, the composition of the recording layer 3 is represented by the formula $Sb_{1-x-mn}Te_xIn_{mx}$ The value of x can be varied by changing the relative thickness of the sub-layers 3a and 3b, and the value of m can be varied by using different $TeIn_m$ targets. For this example, the total thickness of the sub-layers 3a and 3b was kept at about 16 nm.

These disks were tested using the Pulstec tester as described earlier. A random EFM data pattern was recorded on each disk using a write strategy as illustrated in FIG. 2. Same parameters Pb=0.5 mW, T1=0.32 T, T2=0.32 T and T3=0.8 T were used for all disks but the value of Pw and Pe was optimized for each individual disks. The readout data-to-clock jitter of the recorded data in nano-seconds was used as an indication for the disk quality. Low jitter values indicate good recording performance. Because these disks were rewriteable disks, we measured the jitter values after 10 direct overwrite cycles. These values are plotted in FIG. 7 below, wherein each curve represents a distinct m value and each point on the curves represents a disk with a distinct x value.

Figure 7:
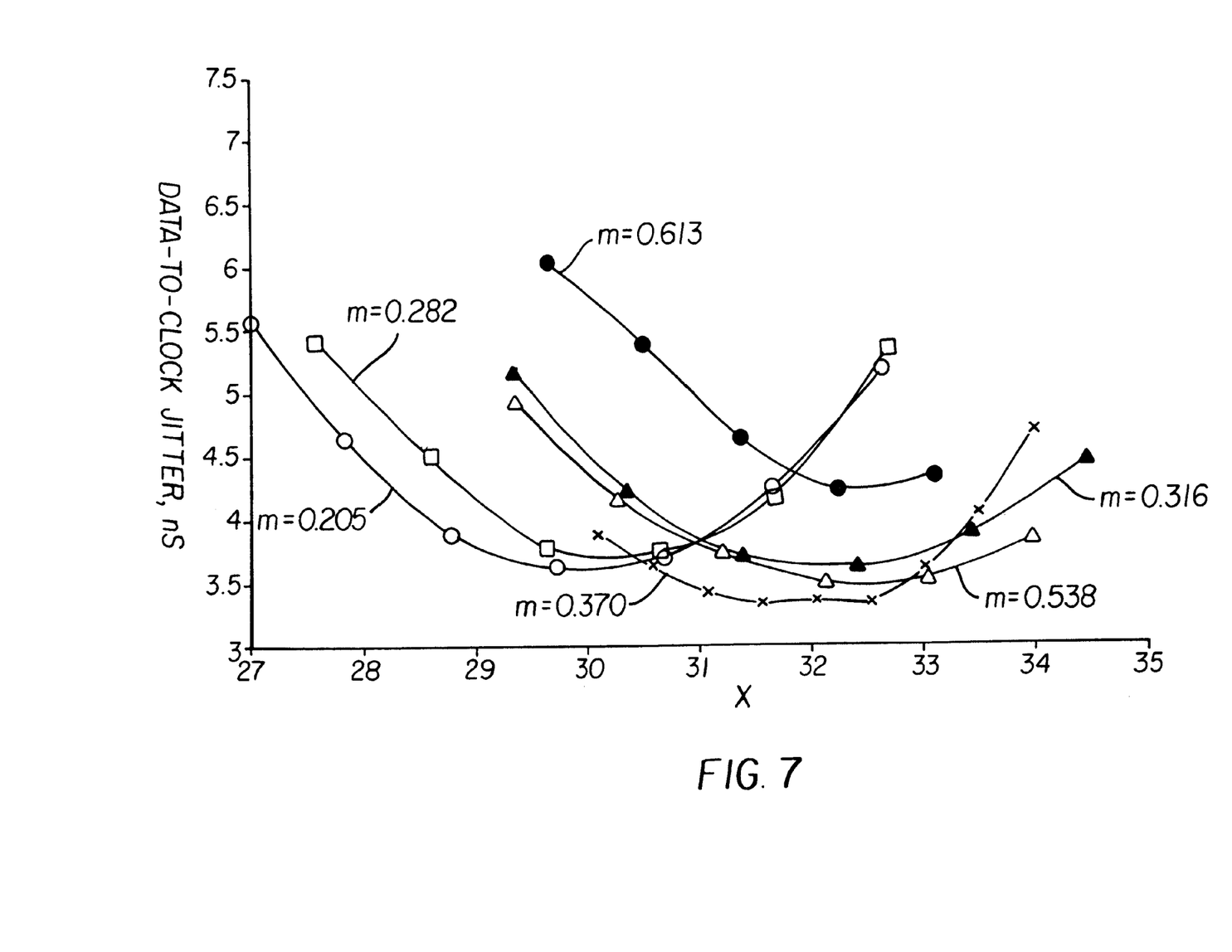
FIG. 7 shows the dependence of measured data-to-clock values on phase-change material composition.

It has been found that disk performance depends strongly on both x and m. If m is less than 0.2, the recorded data are not stable. Heating the disk at 80° C. for 16 hours caused the recorded data to disappear. If m is larger than 0.65, we could not obtain good recording performance at any x value. For m values between these two extremes, the disk performance is a strong function of x. Although the preferred range of x depends on m, FIG. 7 shows that good recording performance can be achieved within the range 0.28<x<0.35.

The invention has been described in detail with particular reference to certain preferred embodiments thereof, but it will be understood that variations and modifications can be effected within the spirit and scope of the invention.

PARTS LIST
1 substrate
2 dielectric layer
3 phase-change recording layer
3a sublayer 3b sublayer
4 dielectric layer
5 metallic reflector layer
6 UV-curable lacquer layer

What is claimed is:

1. A rewriteable phase-change optical recording element comprising:
   (a) a substrate; and
   (b) a recording layer over the substrate having at least a sub-layer comprising substantially Sb and a comprising $TeIn_m$ wherein $0.063 > m > 0.15$; the thickness of the sub-layers being selected so that when subject to laser light during a writing process the composition mix together to form a high reflectivity crystalline region without using any initialization or mixing processes prior to the writing processes.

2. The rewriteable phase-change optical recording element according to claim 1 wherein the first sub-layer is adjacent to the substrate and is crystalline in structure prior to mixing.

3. The rewriteable phase-change optical recording element according to claim 1 wherein the composition of the recording layer after mixing the sub-layer is represented by the formula $Sb_{1-x-mx}Te_xIn_{mx}$ wherein $0.63 \geq m \geq 0.15$, and $0.35 \geq x \geq 0.28$.

4. A method for recording on a rewriteable phase-change optical recording element according to claim 1 comprising pulsing the laser light between at least three power levels wherein both the highest power level and the second highest power lever cause the sub-layers to melt, mix together and solidify.

* * * * *